H. N. MOORE.
TRANSMISSION MECHANISM.
APPLICATION FILED APR. 10, 1920.
Reissued Sept. 28, 1920. Fig 1 14,952.
2 SHEETS—SHEET 1.
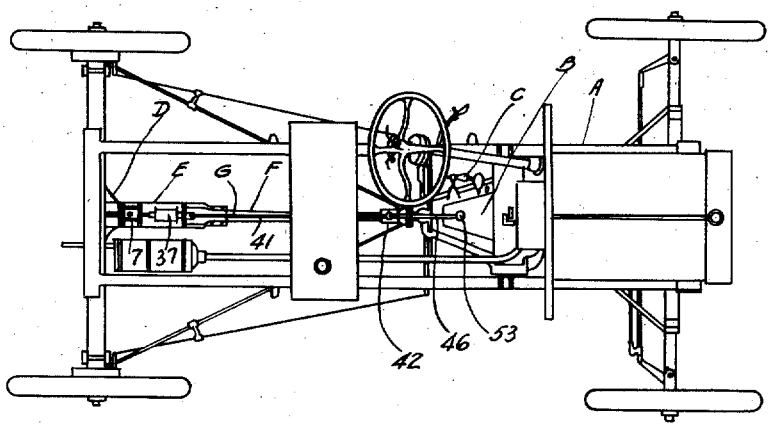
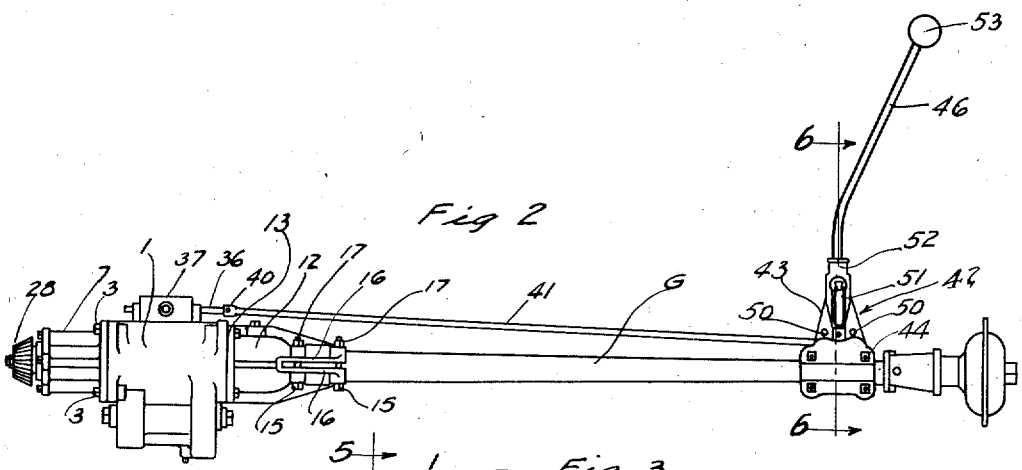
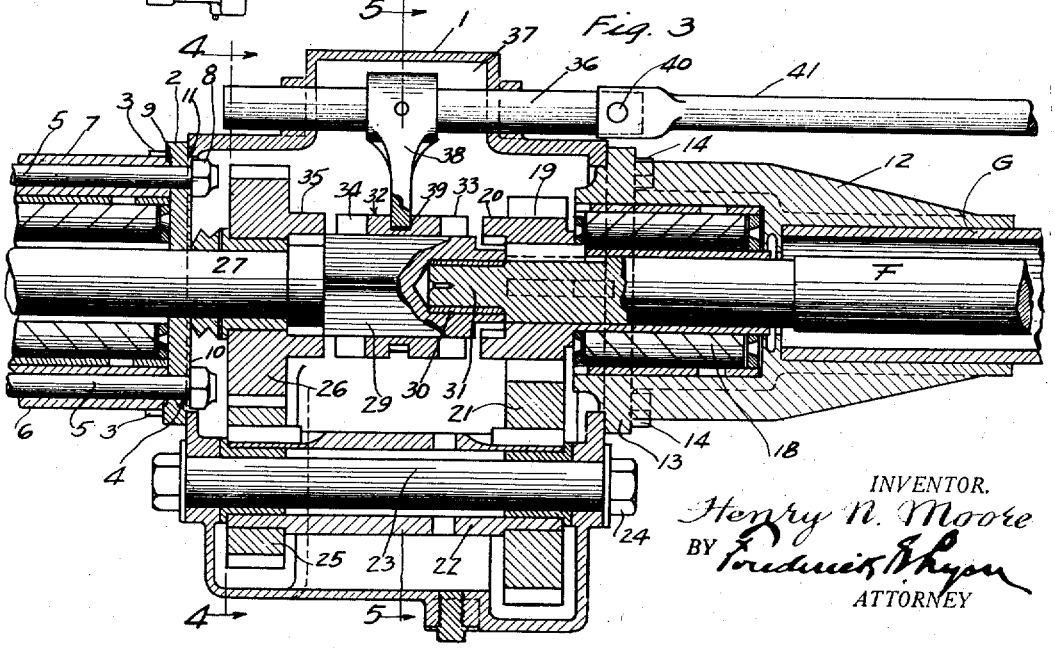
INVENTOR.
Henry N. Moore
BY Frederick B. Ryan
ATTORNEY

H. N. MOORE.

TRANSMISSION MECHANISM.

APPLICATION FILED APR. 10, 1920.

Reissued Sept. 28, 1920. 14,952.

2 SHEETS—SHEET 2.

INVENTOR.

Henry N. Moore

BY Frederick S. Ryan

ATTORNEY

UNITED STATES PATENT OFFICE.

HENRY N. MOORE, OF LOS ANGELES, CALIFORNIA, ASSIGNOR TO TRACTOR-TRAIN COMPANY, A COPARTNERSHIP CONSISTING OF HIMSELF, ETHAN C. LE MUNYON, AND FRANK E. ECKHART, ALL OF LOS ANGELES, CALIFORNIA.

TRANSMISSION MECHANISM.

14,952. Specification of Reissued Letters Patent. Reissued Sept. 28, 1920.

Original No. 1,320,635, dated November 4, 1919, Serial No. 184,873, filed August 7, 1917. Application for reissue filed April 10, 1920. Serial No. 372,982.

*To all whom it may concern:*

Be it known that I, HENRY N. MOORE, a citizen of the United States, residing at Los Angeles, in the county of Los Angeles and State of California, have invented a new and useful Transmission Mechanism, of which the following is a specification.

This invention relates to improvements in automobiles and more particularly to a transmission mechanism attachment therefor.

An object of the invention is to provide as an attachment for a well-known type of automobile having only two speeds forward, auxiliary transmission mechanism which will permit several speeds forward in addition to the forward speeds provided by the transmission proper and therefore increase the efficiency of the automobile.

Another object is to provide transmission mechanism which may be easily attached to an automobile without necessitating any material change in the construction of the automobile.

A further object is to provide a transmission attachment of the above described character which is extremely simple in construction, comparatively inexpensive and adapted for attachment in such manner that the entire power transmission mechanism of the automobile to which it is attached will be materially strengthened and improved.

Other objects and advantages will appear in the course of the following description.

The accompanying drawings illustrate the invention.

Figure 1 is a top plan view showing an automobile with my transmission attachment mounted thereon.

Fig. 2 is a side elevation of the complete attachment.

Fig. 3 is a longitudinal vertical section taken through the mechanism.

Figure 4:
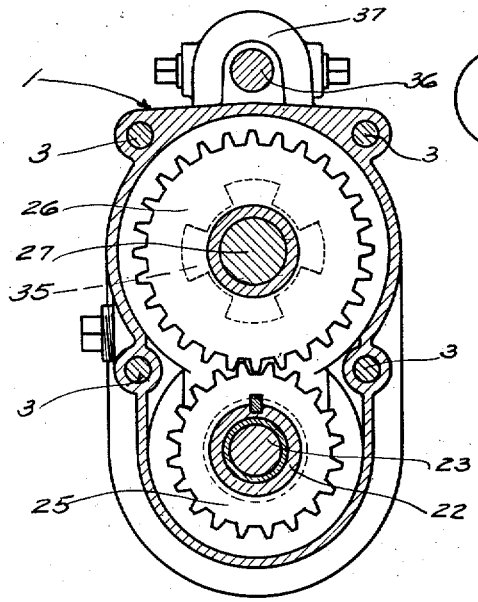
Fig. 4 is a sectional view taken on line 4—4 of Fig. 3.
Figure 6:
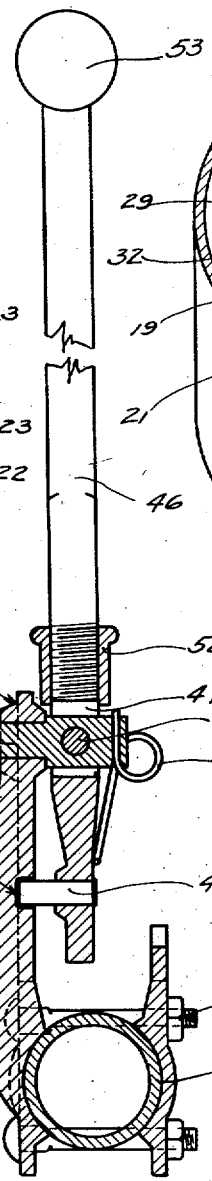
Fig. 6 is a sectional view taken on line 6—6 of Fig. 2.
Figure 5:
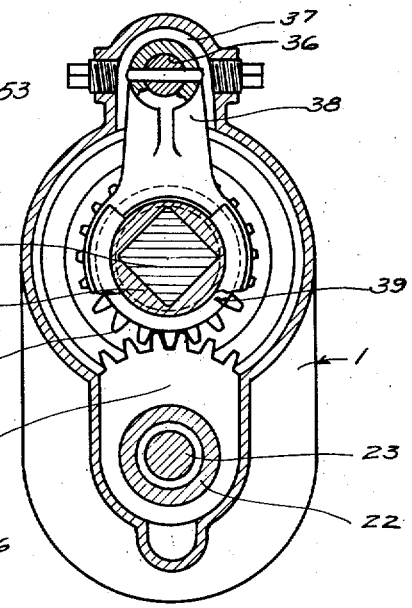
Fig. 5 is a sectional view taken on line 5—5 of Fig. 3.
Figure 7:
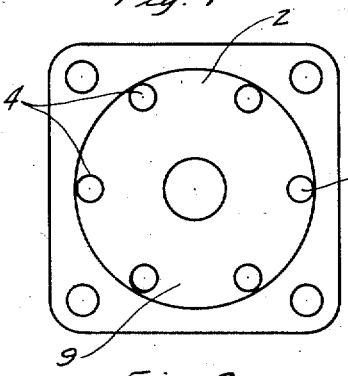
Fig. 7 is a front elevation of the plate for attaching the mechanism to the differential housing.
Figure 8:
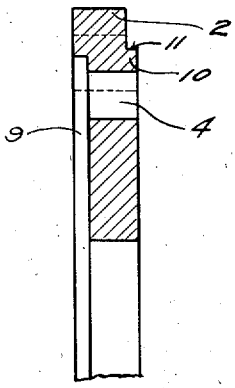
Fig. 8 is a fragmentary vertical sectional view taken through the plate shown in Fig. 7.

As shown in Fig. 1 of the drawings, an automobile of a well-known type is equipped with my transmission mechanism. This type of automobile is provided with planetary transmission having two speeds forward and one speed in reverse.

A designates an automobile including transmission mechanism B controlled by a pedal C. This transmission provides two speeds forward and one speed in reverse. Another essential element of the automobile with which my attachment coöperates is the differential D, to the housing of which is secured the gear casing of my transmission mechanism. E designates my transmission mechanism as an entirety, said mechanism including the automobile drive shaft F. This drive shaft F and its housing G are not parts of my attachment, however, and constitute elements of the automobile proper, it only being necessary to shorten these elements F and G in order to provide for the attachment of my mechanism to the automobile.

1 designates a gear casing which is open at both ends and houses the transmission gears. A plate 2 closes the rear end of the casing 1 and is secured thereto by bolts 3. Openings 4 are formed through the plate 2 and receive bolts 5 carried by the differential housing section 6. There is provided a roller bearing housing section 7 forming a part of the automobile and which is secured to the housing section 6 by the bolts 5. The bolts 5 extend through beyond the housing section 7 and through the openings 4. Nuts 8 are turned on the bolts 5 and upon the inner side of the plate 2 and hold the casing secured to the housing section 6. The outer end of the housing section 7 engages the outer face of plate 2 within a depression 9 formed therein. The inner side of the plate 2 is provided with an annularly offset portion 10 which defines a shoulder 11 adapted to engage upon the inner side of the casing 1. This shoulder 11 acts as a centering means in positioning the parts, causing the plate 2 to properly aline when inserted in position.

Before attaching the casing, as described, to the differential housing section 6 of the automobile, the drive shaft F and housing G therefor are shortened in any suitable manner so as to provide for their connection with the transmission mechanism E.

There is provided a clamping means to connect the shaft housing with the transmission mechanism E which comprises a shell-like clamping member 12 forming a bearing support which is split longitudinally for a part of its length in order to provide for a resilient clamping action. At one end this member 12 is provided with flanges 13 secured by the bolts 14 to the other open end of the casing 1. The flanges 13 are located in spaced relation to the inner end of the member 12 and said inner end projects slightly into the casing. The shaft housing G is mounted within the member 12. Bolts 15 are inserted through alined opposed ears 16 formed on the split end of the member 12 and have nuts 17 turned on their screw-threaded ends. By tightening these nuts 17 the split end of the member 12 will tightly clamp the housing G. Roller bearings 18 are mounted within the member 12 adjacent to the inner end thereof, said shaft F extending through said bearings and into the casing 1. The member 12 thus forms a bearing support. Keyed to the end of the shaft F is a drive gear 19 formed upon one face with jaw clutch-members 20. The gear 19 meshes with a gear 21 which is keyed to one end of a tubular shaft 22. The tubular shaft is supported upon a bolt 23 which is inserted through the casing and held in position by a nut 24. A gear 25 is mounted upon the other end of the tubular shaft 22 and meshes with a gear 26 which is loosely mounted upon a shaft 27. The shaft 27 corresponds to the drive shaft F and is concentric therewith. Upon the rear end of the shaft 27 a differential pinion 28 is mounted, said pinion being a part of the differential gearing. The shaft 27 extends inwardly beyond the center of the casing 1 and at said extended end is enlarged and squared as at 29. At its end face the shaft 27 is provided with an opening 30 which receives the reduced end 31 of the shaft F, said reduced end 31 rotating freely within said opening 30.

As a means for connecting the shaft 27 for rotation with the shaft F there is provided a sliding clutch member 32 having jaw clutch faces 33 and 34 at its ends. The clutch face 33 is adapted for coöperation with the clutch members 20 on the gear 19 so as to lock the shafts F and 27 together for rotation. The clutch face 34 is adapted for coöperation with the clutch member 35 formed on the opposed face of the gear 26.

There is provided a means for shifting the clutch member 32 which comprises a slide bar 36 slidably extended through an offset 37 formed upon one side of the casing 1. A yoke 38 is fixed to the shaft 26 and is mounted within an annular groove 39 formed in the clutch member 32. The forward end of the bar 36 is pivoted as at 40 to an operating rod 41. The rod 41 extends along one side of the shaft F to a point adjacent to the forward end of the shaft and at its forward end is connected with an operating means 42.

The operating means 42 comprises a bracket 43 secured by clamping means 44 to the drive shaft housing G. The bracket 43 is provided with an upright arm 44, adjacent to the upper end of which is pivotally mounted a stud 45. An operating lever 46 is connected with the stud 45, there being provided a slot 47 in said operating lever at a point adjacent to its lower end for the reception of the stud 45. A pivot pin 48 is inserted through the lever 46 and stud 45 to pivotally connect the lever with the stud. It will be seen that the lever is universally connected with the bracket 44, it being possible to move the lever back and forth and also in a plane at right angles to the back and forth movement. There is provided a detent 49 on the lower end of the lever 46 which is adapted to extend into any one of three openings 50 formed in the arm 44. A spring means 51 is connected with the outer end of the stud 45 and engages the adjacent face of the lever 46 below said stud so as to hold the detent 49 within certain of the openings 50. The lever 46 is preferably formed in two parts, joined by a coupling member 52. The lower part of the lever may be formed of a solid metal, and to reduce weight and subsequent vibration the upper section of the lever is formed hollow. A suitable ball or gripping member 53 is fixed to the upper end of the lever.

In starting an automobile equipped with my transmission mechanism, the lever 46 is in neutral position, as shown in Fig. 2 of the drawings, causing the shaft F to be disconnected from the shaft 27. This condition is desired in starting or cranking an automobile of the type shown and described, inasmuch as in many instances with these types of automobiles the clutch plates stick to one another and cause the automobile to move forwardly and sometimes injure the operator when first being started. With my transmission mechanism since the drive shaft is not connected with the rear wheels, the above noted disadvantages are eliminated.

The next step is to move the lever 46 rearwardly, and this may be done by gripping it in such manner that the pin 41 is moved out of one of the openings 50 and the lever is then free to be moved backward or forward as desired, however, it is now moved backward into first position so that the clutch member 20 and the shafts F and 27 are connected. The automobile may be operated in the ordinary manner when these shafts are connected.

When it is desired to obtain the gear ratio or speed between the high and low speed provided in the type of automobile illustrated and described, the transmission B first being thrown into high speed, the lever may be grasped and pushed forwardly causing the rod 41 and bar 36 to be pushed rearwardly and the clutch member 32 to cooperate with the clutch member 35. This action locks the gear 26 with the shaft 27. Power is then transmitted from the gear 19 through gear 21, tubular shaft 22 and gear 25 to gear 26 and shaft 27, the latter being connected with the differential as described. When the mechanism is in this position by pushing the pedal C of the automobile forward, the low speed of the transmission B is provided as a gear reduction in combination with the reduction provided by my transmission mechanism, and it will be seen that with these combined reductions a maximum pulling power is obtained.

When a steep hill is approached while running on high gear the driver will shift the lever 7 and pedal C in low speed position so that the climbing and pulling power of the automobile will be materially increased. After the need for the maximum power has passed the pedal C may be allowed to return to high speed position.

I claim:

1. In combination, a drive shaft, a housing for the drive shaft, a differential housing, change speed mechanism including a casing rigidly secured to the housing of the differential, and a tubular clamping member carried by the casing and receiving and clamping the housing of the drive shaft, there being a bearing in the clamping member for the shaft and said drive shaft being operatively connected with the change speed mechanism.

2. In combination, a drive shaft, a housing for the drive shaft, a differential housing, change speed mechanism including a casing rigidly secured to the housing of the differential, a clamping member carried by the casing and receiving and clamping the housing of the drive shaft, said drive shaft being operatively connected with the change speed mechanism, a bracket secured to the drive shaft housing, a lever pivotally mounted on said bracket, means to hold the lever in different positions, and a connection between the lever and change speed mechanism to operate said mechanism.

3. In transmission mechanism the combination with an automobile having differtial gearing, a housing therefor, a drive shaft and a housing for the drive shaft, of an auxiliary transmission casing rigidly secured to the differential housing, a clamping member carried by said casing and receiving the drive shaft housing, said drive shaft extending into the casing, a plurality of gears operatively connected with one another and the drive shaft and differential gearing, mounted within the casing, a clutch member for operating the auxiliary transmission, a rod connected with the clutch member, a bracket fixed to the drive shaft housing, a lever pivoted intermediate its ends upon said bracket and being pivotally connected at its lower end to said rod, and detent means for holding the lever in different positions whereby the transmission mechanism is held in different positions.

4. In transmission mechanism, a casing, change speed gears mounted in the casing, means for connecting one end of the casing with the housing for the differential gearing of an automobile and means for connecting the other end of the casing with the housing for the drive shaft of an automobile comprising a tubular member provided on opposite sides with longitudinal slits, and means for tightening and clamping said member to effect the holding of a drive shaft housing.

5. In combination, a change speed mechanism casing having a plate closing its rear end and bolted to the casing, a differential housing comprising sections, one housing section having a bearing, bolts passing through the plate and through the last named housing section and into another of the housing sections, a shaft journaled in said bearing, a bearing supporting member bolted to the front end of the casing, a bearing in the supporting member, a drive shaft journaled in the second bearing, a housing for the drive shaft connected to the bearing supporting member, and change speed mechanism to operatively connect the shafts to one another.

Signed at Los Angeles, California, this 19th day of February, 1920.

HENRY N. MOORE.

Witnesses:

GEORGE H. HILES,
L. BELLE WEAVER.